United States Patent [19]
Helgesson

[11] 3,864,568
[45] Feb. 4, 1975

[54] AUTOMATIC ISODOSE PLOTTER
[75] Inventor: Alan L. Helgesson, Los Altos Hills, Calif.
[73] Assignee: SHM Nuclear, Sunnyvale, Calif.
[22] Filed: June 19, 1972
[21] Appl. No.: 264,230

[52] U.S. Cl................. 250/252, 250/327, 250/394, 250/521
[51] Int. Cl. .......................................... G01n 23/00
[58] Field of Search....... 250/52, 65 R, 71.5 S, 83 C

[56] References Cited
UNITED STATES PATENTS

| | | | |
|---|---|---|---|
| 3,465,145 | 9/1969 | Leiter | 250/71.5 |
| 3,515,873 | 6/1970 | Higgins et al. | 250/65 X |
| 3,714,429 | 1/1973 | McAfee et al. | 250/71.5 X |

OTHER PUBLICATIONS
"Automatic Isodose Plotter" by G. A. Mauchel et al., from Nucleonics, Vol. 12, No. 12, Dec., 1954, pages 50 and 51.

Primary Examiner—William F. Lindquist
Attorney, Agent, or Firm—Karl A. Limbach et al.

[57] ABSTRACT

An apparatus for automatically detecting and recording two-dimensional isodose curves in a radiation field in a phantom adjacent a radiation source, the apparatus having a water tank, a water immersed detector probe, a digital x-y drive for the detector probe, a water immersed reference probe, an x-y graph recorder and a remote control console with circuit means to operate the x-y drive along a stepping axis and a servoed axis with means to switch the stepping axis and the servoed axis at the corners of isodose curves to obtain accurate isodose plots.

32 Claims, 12 Drawing Figures

AUTOMATIC ISODOSE PLOTTER

BACKGROUND OF THE INVENTION

In the field of radiology, particularly radio therapy and radiography, radiation emissions such as X-rays are emitted from a source and transmitted through any heterogeneous object and differentially absorbed, depending on the physical and chemical properties of the object. In radio therapy penetrant rays are employed to selectively destroy living tissue. In radiography emergent rays are registered on a flourescent screen or photographic film to produce a shadowgraph of the object's interior. Using X-rays as an example of the type of radiation considered, the penetrating ability of emitted rays is dependent in part on the wavelength of the rays and on the nature of the source.

In various applications of radiography, emission sources of different intensity and penetrability are required for the composition of the object examined and the registration medium employed. The sources must therefore be calibrated to determine and interpret the registered results.

In industrial uses comparative calibration can be experimentally determined by the use of penetrameters which usually are plates of the same material to be examined with centrally located holes of descending diameters. Visualization of the smallest hole determines the comparative sensitivity.

However, in medical uses for internal therapy or examination of patients, experimental trial and error methods are infeasible. Because the human body can withstand only limited levels of radiation exposure over defined periods of time, the intensity and penetrability of radiation emissions must be carefully controlled and calibrated prior to examination. To approximate the X-ray absorptive characteristics of the human body, a volume of water is customarily employed as a phantom at which radiation emissions are directed. A detector probe, which is capable of determining the level of radiation at any selected point, is immersed in a water phantom contained in a tank. The emission source is arranged to direct a beam of radiation horizontally against a wall of the tank. The distance or depth from the incident wall of the tank provides an approximate correlation, for purposes of radiation intensity measurement, to the corresponding internal depth in a patient. The radiation intensities at various depths and distances from the centerline of the radiation emission field can thus be calibrated in a uniform standard medium approximating the human body.

In order to obtain a graphical representation of the emission field in the water tank, isodose contours can be plotted. These contours can be graphically plotted for constant intensities which may be predetermined percentages of the maximum intensity or specific, defined levels of intensity. Heretofore, the principal method of plotting involved a complete x-y field scan by an immersed detector probe connected to a trailing graphical recorder. Each time in a directional pass that the predetermined intensity was sensed, a recorder pen dropped to mark the position in the x-y field of the sensed intensity. However, the process of stepping through one axis and sweeping through the other axis is time consuming. Furthermore, the graphical representation is not of the best quality since it is comprised of a series of parallel dashes resulting from the pen drop on each parallel pass.

It is a primary obect of this invention to provide apparatus for servo tracking an isodose contour in a manner producing a quality resolution graphical representation of the contour.

SUMMARY OF THE INVENTION

This invention relates to automatic isodose plotter apparatus providing a remote-controlled system for making two-dimensional measurements of a radiation field in a water phantom. The preferred embodiment of the plotter apparatus includes a graphical recorder for recording a permanent record of measurements obtained during operation. In addition to isodose plotting under automatic, semi-automatic or manual control, the apparatus is capable of obtaining flatness scans, measurement of field intensity on a line transverse to the central beam axis of a radiation field at any depth in the water phantom, and depth dose scans, measurement of field intensity on any line parallel to the central beam axis.

In performing these measurements, an x-y drive locates a radiation sensitive detector probe in a selected plane in a water phantom tank. While apparatus can be adapted to operate in a vertical plane, in the preferred embodiment, operation in the horizontal plane is described. The horizontal plane is manually selected by vertical adjustment of the probe. In order to attenuate the effects of an erratic radiation field caused by perturbations of the energy at the radiation source, a stationary reference probe from which comparative measurements are taken for selected operations is positioned within the radiation field in the water tank and utilized for selected operations.

While direct measurements can be taken from the detector probe when performing a flatness scan or a depth scan, it is desirable to utilize a comparative signal from the detector probe and reference probe for isodose plotting. In this manner erratic and temporary changes in the radiation field strength will be detected by both probes, and cancelled when utilizing the comparative signal for servo tracking of the isodose curve.

The x-y drive includes a stepping motor and a position detector for each axis of operation to locate the detector probe as directed by a control unit. The control unit coordinates the input directives and the graphical output of the recorder. Flatness scans and depth dose scans are accomplished in a conventional manner by a straight line velocity drive of the detector probe on one of the x-y axes with the recorder trailing on one axis and servoing on the other axis to the field intensity signals from the detector probe.

Isodose curve plotting, however, utilizes new techniques in servo tracking the isodose contours. The signals from the reference probe is calibrated to be equal to the signal from the detector probe at some reference intensity, usually the maximum intensity at the radiation beam center adjacent the incident wall of the tank. With this signal representing 100 percent intensity the reference signal is then attenuated by either a potentiometer or a defined percentage switching logic to obtain a desired percentage of the calibrated signal.

A null signal obtained from the difference between the signal from the detector probe and the attenuated signal from the reference probe controls both servo tracking of the isodose contours and the dropping of the pen in the recorder for graphical representations. For pen control, the difference between the attenuated reference signal and the detector signal is amplifed and fed to opposite polarity inputs of a dual comparator. A positive threshold voltage is introduced to one half of the comparator and a negative voltage is introduced to the other half of the comparator. When the null signal is within the threshold range or passing through, an output signal is sent to the graphical recorder causing the pen to drop.

For servo tracking, the null signal and a velocity control signal are transferred to the x and y axis stepping pulse generators. The determination of which signal is fed to which axis and with what polarity is controlled by information on the state and direction to be plotted, stored in digital registers. The null signal into the stepping pulse generator generates stepping pulses for operation of a stepping motor for one drive axis. The velocity signal, likewise into the stepping pulse generator, operates the stepping motor for the other axis.

Thus, the detector probe is driven on one axis by a velocity signal and servoed on the other axis by the null signal. Oscillation about the zero null signal is controlled by a stability control which with the velocity control correlatively controls the spacing of the pen markings in the recorder.

Because of the usual U-shaped nature of the isodose contours, automatic servo tracking must have means to change the direction of the velocity drive axis. Furthermore, in order to obtain an accurate plot, the servo axis unit position change should not be too excessive for each unit position change in the velocity axis. Both of these problems are solved by an automatic state switching loop.

The function of the automatic state switching loop is to determine when the corner of an isodose contour has been reached, and to automatically interchange the velocity controlled and servoed axes.

Stepping pulse signals from the stepping pulse generator are examined in intervals of sixteen successive step signals in the velocity controlled axis. If during any interval the servoed axis has responded with thirty-two (32) step signals indicating the detector probe is moving at an angle greater than 63° to the velocity controlled axis, it is determined that the corner of the contour has been reached and a signal is sent to interchange the velocity controlled and servoed axes and establish the proper driving directions for the two axes in the new state.

When one contour has been completed, the control will, if other selected percentages have been entered, automatically reverse the direction of the velocity controlled axis, step down to the next lower entered percentage and track that isodose contour. The process is repeated until all entered percentages have activated a tracking of the respective isodose contours.

DETAILED DESCRIPTION OF THE INVENTION

Figure 1:
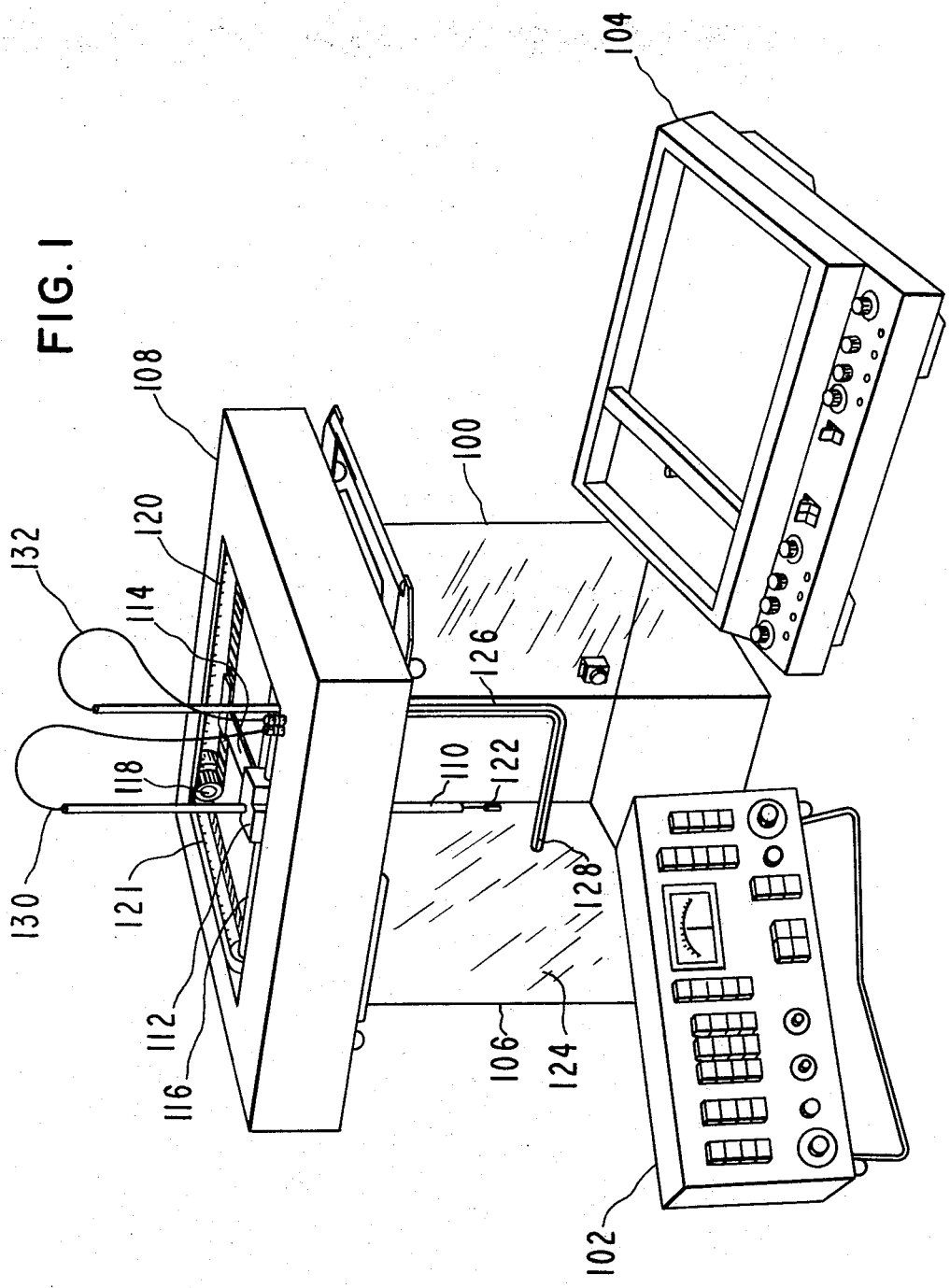
FIG. 1 is a perspective view of the isodose plotter apparatus.

Considering FIG. 1, three primary units of the isodose plotting apparatus are shown, the x-y drive unit 100, the control unit 102, and the recording unit 104.

The x-y drive unit includes a water phantom tank 106 which is fabricated from a clear plexiglass and contains a volume of water at which a horizontal radiation source (not shown) is directed. On top of the phantom tank 106 is an x-y drive 108 which includes a frame 109 which supports a detector probe 110 in a movable guide block 112. The block 112 rises on an x-axis guide rod 114 and an orthoganal y-axis guide rod 116. The x-axis guide rod 114 is incrementally moved in steps of 0.01 inch by an incremental stepping motor 118 which drives a belt 120 to which the guide rod is attached. The y-axis guide rod is incrementally moved by an identical arrangement of motor (not visible) and belt 121. By selective operation of the incremental stepping motors, the detector probe 110 can be moved to any selected position in a horizontal plane.

The detector probe 110 contains at its distal end a radiation sensitive diode 122 which can be calibrated to provide a direct measurement of radiation in rads/min. The diode 102 can be moved to any height in the water phantom tank 106 by manual adjustment of the position of the probe 110 in the support block 112. Ordinarily the height of the probe is adjusted to the centerline of the radiation beam which is directed at the front wall 124 of the water tank 106.

In order to adjust to erratic variations in the radiation source and to provide a convenient comparative reference source for isodose contour plotting, a stationary reference probe 126 is attached to the x-y drive frame 108. The reference probe is L-shaped to avoid shadowing the diode 122 of the detector probe 110 and is manually adjustable in height and, within limits, in horizontal position. It is only necessary that a radiation sensitive probe 128 at the end of the reference probe be positioned within a high intensity area of an emitted radiation field to provide a relatively strong comparative signal. Ordinarily it is centrally positioned adjacent the front wall 124 below the detector probe 110 so as not to shadow or interfere with the movement of the diode 122 at the end of the detector probe.

The cable leads, 130 and 132, connected to the detector diode 122 and the reference diode 128, respectively, are connected to a remotely placed control unit 102 by a cable (not shown). The control unit and recorder are remotely placed from the water tank and x-y drive unit to permit an operator to be removed from the area of an activated radiation source during testing to avoid unnecessary radiation exposure.

Figure 2:
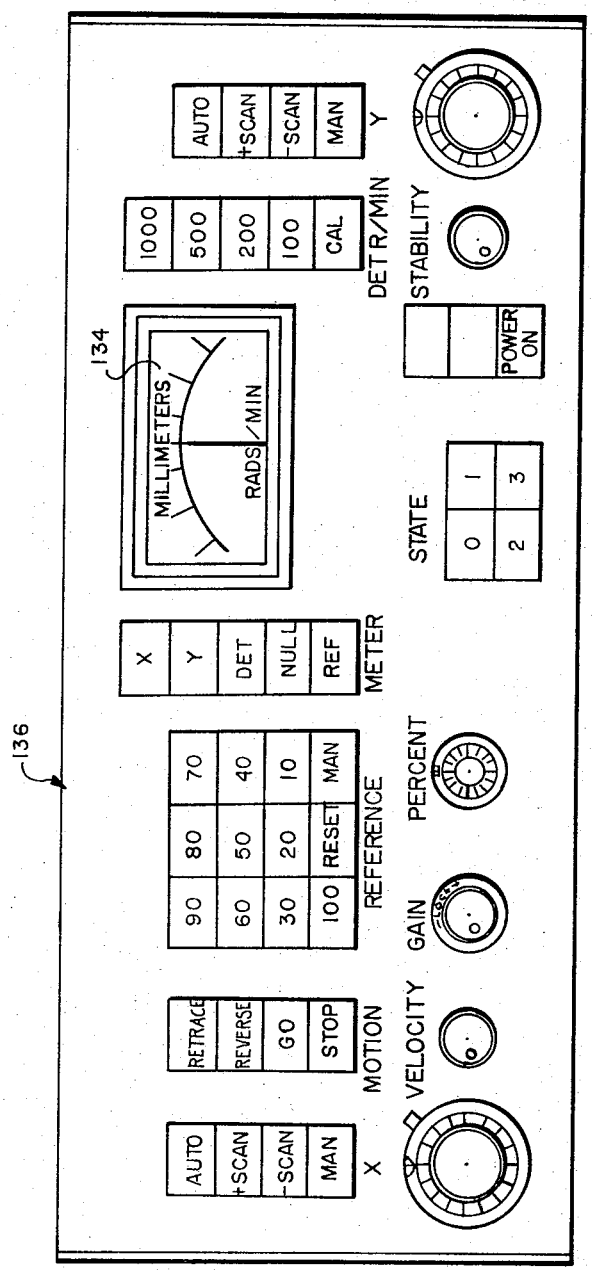
FIG. 2 is a front view of the control panel of the control unit of the apparatus in FIG. 1.

The control unit commands the movement of the x-y drive, interprets the signals from the detector and reference diodes and controls the operation of the recording unit 104. The entry controls and a multiple reference meter 134 on the control panel 136 of the control unit are shown in greater detail in FIG. 2. With reference to FIG. 2, the following brief description of the controls is helpful in understanding the operation of the isodose plotting apparatus.

The two depressable selectors labeled MAN in the identical sets of x and y position selectors at each end of the control panel allow two four turn dials of potentiometers labeled x and y to enter a precise position setting for either axis. The selectors labeled −SCAN and +SCAN in each x and y set of selectors enter an axis scanning signal in either the forward or reverse direction according to assumed direction states. Usually a position setting is entered for one axis and a scan selection is entered for the other axis, such that the detector probe 110 in FIG. 1 is servoed to the entry setting and driven the length of the selected scan axis. Beam flatness plots and depth dose plots are taken in this manner.

The dial labeled VELOCITY is a velocity potentiometer which regulates the velocity of the detector probe 110 on a velocity controlled axis as opposed to a servoed axis during scanning or isodose tracking.

The set of selectors labeled MOTION above the velocity control provides selection of states as suggested: STOP, stopping all motion instantaneously; GO, allowing all entries to proceed; REVERSE, immediately reversing the output direction of all entries; and, RETRACE, causing a retrace of a plotted curve at the end of its trace.

The dial labeled GAIN is a gain potentiometer for adjusting the gain of a signal from the reference probe 126 in order that it can be calibrated against a signal from the detector probe 110.

The set of selectors labeled REFERENCE provides selection of specific decade percentage entries for automatic successive plotting of isodose curves as numerically indicated and includes a selector labeled RESET for voiding all reference percentage entries and a selector labeled MAN for allowing a manually selected percentage of any value to be entered by the dial below the set of REFERENCE selectors, labeled PERCENT.

The dial labeled PERCENT is a percentage potentiometer having a 10 turn dial permitting accurate selection of any desired percentage when the above MAN selector has been depressed.

The set of selectors labeled METER provides selection of five entries to be displayed by the adjacent multimeter 134 as suggested: REF, displaying the signal from a reference amplifier in rads./min.; NULL, displaying the null signal from a NULL amplifier in rads./min.; DET, displaying a signal from a detector amplifier in rads./min.; Y displaying the y-axis position in millimeters; and X displaying the x-axis position in millimeters.

The set of selectors labeled STATE provide a selection of the starting position and direction of the detector probe according to a predetermined table of axis selections for variants of servo, velocity and direction.

The dial labeled STABILITY is a potentiometer for adjusting the amplitude of detector probe oscillation on servoing.

The labeled selectors and dials operate switches and potentiometers, respectively, and will be referred to by their label identification when defining switches, modes or states in the following descriptions of the block diagrams shown in the drawings.

Figure 3:
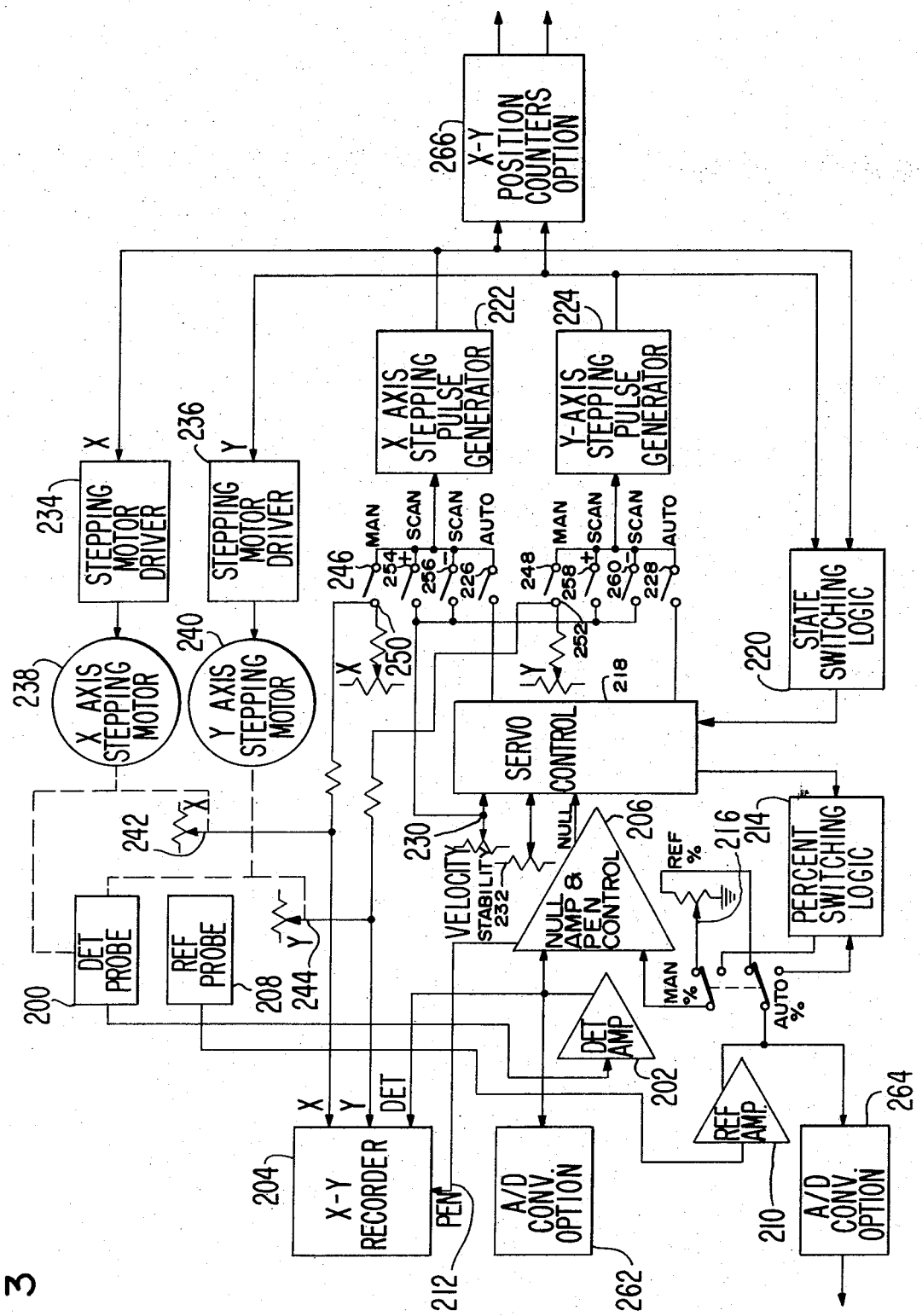
FIG. 3 is a schematic block diagram of the operation of the apparatus of FIG. 1.

Referring to FIG. 3, a simplified block diagram provides a simplified schematic of the overall operation of the combined units of the plotter apparatus.

A signal from the detector probe 200 is amplified by a detector amplifier 202 and either fed to the x-y recorder 204 directly for direct radiation intensity measurements or fed to the null amplifier and pen control 206 for isodose plotting. A signal from the reference probe 208 is similarly amplified by a reference amplifier 210 and adjusted by a manual reference percent potentiometer 212 or by automatic percent switching logic 214 to provide a percent reference signal that is fed to the null amplifier and pen control 206 for comparison with the detector signal.

When the difference between the attenuated reference signal and the detector signal is zero, a signal is sent to the pen control 216 in the x-y recorder 204 which for a measured instant lowers a pen on a recording paper (not shown). This signal difference or null signal is also amplified and fed to a servo control 218. With information on the present and future state of detector probe movement from the state switching logic 220, the dual output from the servo control operates the x-axis and y-axis stepping pulse generators 222 and 224 respectively when the AUTO switches 226 and 228 are closed. The servo control 218 determines which axis is servoed with input from the null signal and which axis is velocity controlled with input from velocity potentiometer 230. Control of probe oscillation about the plotted isodose contour is accomplished by a stability potentiometer 232. Information as to the completion of curve plots is fed back to the percent switching logic 214 from the servo control 218 to cause percent stepdowns at the end of each plot.

The dual output from the servo control 218 is fed to the x-axis stepping pulse generator 222 and the y-axis stepping pulse generator 224 to develop a pulse analog to the velocity signal or servo signal for operating the x-axis stepping motor driver 234 or the y-axis stepping motor driver 236. The drivers in turn power the x-axis stepping motor 238 and the y-axis stepping motor 240 respectively.

The x-axis and y-axis position of the detector probe is sensed by x-axis potentiometer 242 and y-axis potentiometer 244 and sent to the x-y recorder 204 wherein the pen is positioned accordingly.

For beam flatness plotting or depth dose plotting, the operation is comparatively simple. For a beam flatness plot a y-axis position is selected and an x-axis scan is made with radiation intensity directly recorded from the detector probe. For a depth dose plot, an x-axis position is similarly selected and a y-axis scan is made again with radiation intensity directly recorded from the detector probe. Referring to FIG. 3, the x or y position is selected by closing either the x-manual switch 246 or y-manual switch 248 and adjusting an x position control potentiometer 250 or y position control potentiometer 252 to the position desired. The difference between the signals from the position sensing potentiometer 242 or 244 and the respective position control potentiometer 246 or 248 is fed to the respective stepping pulse generator 222 or 224 to produce either increase or decrease position pulses to drive the detector probe until the signal difference is zero. The axis scan is accomplished by closing either the x-axis plus or minus scan switch 254 or 256, or the y-axis plus or minus scan switch 258 or 260 permitting a signal from the velocity potentiometer 230 to pass to the selected stepping pulse generator and drive the detector probe across the selected axis in the selected direction. The reference legends in FIG. 3 correspond in part to the reference labels in FIG. 2.

In addition to the basic isodose plotting apparatus above described, additional options may be included without changing the fundamental invention. For example, an analog to digital converter 262 may be attached to the detector output signal line to provide a digital output for computer use. Similarly an analog to digital converter 264 can be attached to the reference output signal line. Also an x-y position counter 266 can be attached to the stepping pulse generator output lines to convert pulsed signals into digital signals. Together with the above noted options, the basic apparatus provides sufficient information for computer plotting.

When computer plotting, the attenuated reference signals and detector signals can be taken directly from the control console amplifiers for computers having analog to digital converters or these signals can be first converted by the analog to digital options before being made available for computer use. The computer can directly step the drive unit, and thus the apparatus can be selectively adapted for computer use, the additional optional equipment necessary depending on the capability of the computer employed.

While the above provides a general description of the invention, the best mode contemplated of carrying out the invention is described more fully in the following detailed description of the various modules and circuit cards which make up the electronic components of the isodose plotting apparatus.

X and Y Stepping Pulse Generator Circuit Cards

Figure 4:
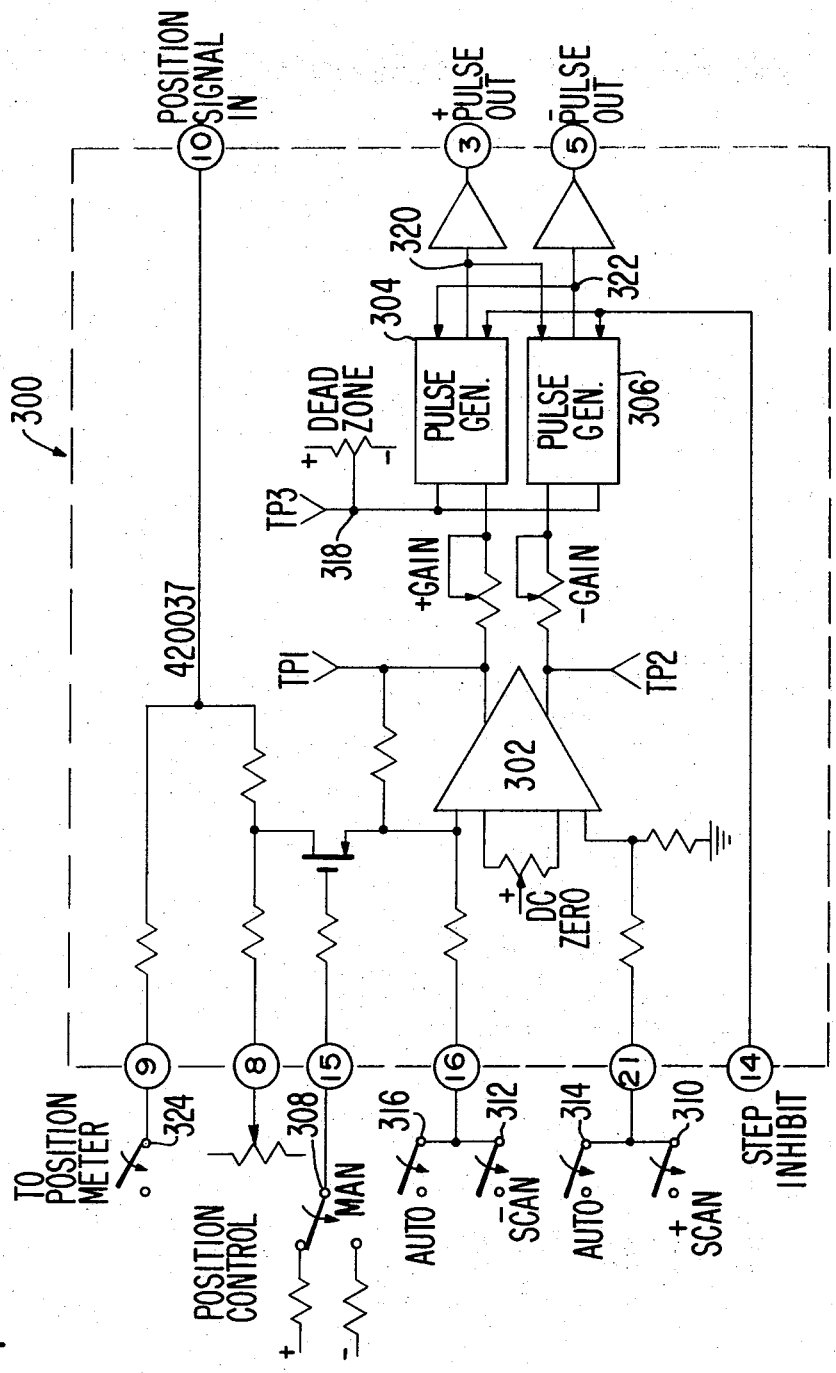
FIG. 4 is a block diagram of the X and Y pulse generator circuit cards.

Referring to FIG. 4 the X and Y Stepping Pulse Generator Circuit Cards are identical, each controlling one axis of movement on the X-Y drive; therefore, only one of the two cards is shown in FIG. 4. These two circuit cards are located within the control unit 102 shown in FIG. 1. The cards have identical inputs and outputs. In FIG. 4 the exemplar X or Y stepping pulse generator circuit card 300 contains a dual-output operational amplifier 302 which drives two separate stepping pulse generators 304 and 306. The generator produces decrease and increase position pulses for the Stepping Motor Driver Assembly which drives the stepping motor on the X-Y drive and which will be considered in greater detail with reference to FIG. 5. In MAN position control 308, the amplifier 302 obtains an input which is the difference between the position setting as measured on the X-Y drive 242 and 244 in FIG. 3 and the desired position as set by an X or Y potentiometer on the front panel of the control unit as noted in FIG. 2. Stepping pulses are generated until this difference is reduced to zero. In the +SCAN and −SCAN selector modes 310 and 312 respectively, the card obtains a signal from the VELOCITY potentiometer noted in FIGS. 2 and 3 which gives a continuous adjustment of the scanning speed. In the AUTO mode 314 and 316 jointly, the card receives a signal from the Servo Control Circuit Card, considered hereafter in reference to FIG. 9, which is either a constant velocity drive or an error voltage for servo control to an isodose contour. The rate at which stepping pulses are produced is proportional to this error voltage.

The amplifier 302 is a dual-input, dual-output operational amplifier. The input from card pin 16 and the amplifier output at TP1 are oppositely phased as is the input from card pin 21 and the output at TP2. Whenever the two outputs are equal in voltage, this voltage is not necessarily zero, a dead zone adjustment 318 is necessary to obtain a smooth crossover between the positive and negative pulse generators 304 and 306 respectively. The two pulse generators 304 and 306 are cross coupled at points 320 and 322 so that random noise at the output of the amplifier 302 will not cause simultaneous integration in both pulse generators, resulting in excessive random stepping of the increase and decrease pulse outputs. The increase and decrease position pulses out of this card are decoded by the Stepping Motor Driver Assembly of FIG. 5 on the X-Y drive to drive a stepping motor shown therein which determines the detector probe position. A 1K potentiometer 242 or 244 in FIG. 3 on the X-Y drive is coupled to the motor to produce an analog readout of the position of the detector probe. The voltage from the potentiometer 242 or 244 which increases as the position increases, enters at card pin 10 and is brought out at card pin 9 when switch 324 is closed as a current to the multiple reference meter 134 on the front panel shown in FIG. 2. When the METER selectors shown in FIG. 2 are in the X or Y positions, the meter 134 indicates the position of the detector probe on the X-Y drive. At card pin 14 a step inhibit signal enters the card which is controlled by the STOP-GO selectors shown in FIG. 2. When in the STOP state, the pulse generators are completely inhibited from generating either plus or minus stepping pulses, thus enabling the operator to stop a scan or the motion of the probe 200 at any point.

Stepping Motor Driver Assembly

Figure 5:
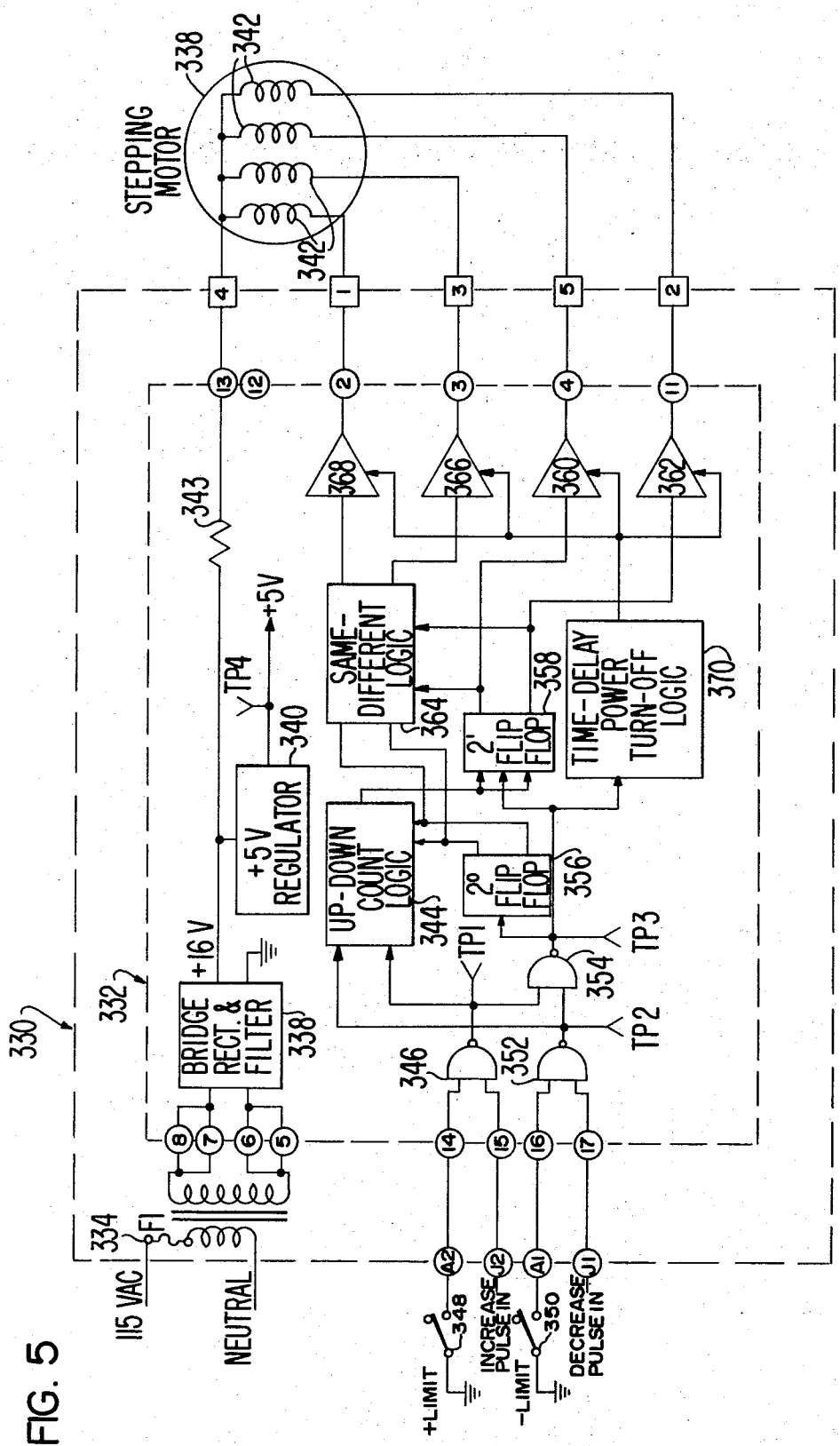
FIG. 5 is a block diagram of the stepping motor driver assembly.

Referring to FIG. 5 the Stepping Motor Driver Assembly 330 and its subassembly the Stepping Motor Driver Circuit Card 332 accept 115 VAC as a power input 334 and generate +16 VDC at a bridge rectifier and filter 336 for powering a stepping motor 338 and +5 VDC at a 5 volt regulator 340 for powering the digital driving logic shown on the card in FIG. 5. Increase and decrease pulses enter on coaxial line inputs. These pulses are counted and decoded by the digital logic so that four windings 342 on the stepping motor 338 are energized in proper sequence.

The 115 VAC input is transformed to 12.6 VAC which is full wave rectified and filtered to produce +16 VDC. A power resistor 343 drops this voltage to +8 VDC when the stepping motor is operated in the normal manner. The regulator 340 for the power supply produces +5 volts for powering the circuits on the card and may be measured at TP4.

A positive increase pulse enters the card at pin 15. This line is normally held down to a voltage near ground potential. The input pulse should be at least 3 volts in amplitude and greater than 30 microseconds duration to produce a step. A negative output pulse is produced which is observable at TP1. This pulse sets the up-down count logic 344 to the increase state. The increase pulse is inhibited from passing through the first gate 346 if the increase limit switch 348 is closed. This line entering at card pin 14 is normally pulled up to +5 volts, but is grounded when the limit switch 348 is actuated. The closing of the limit switch does not produce any extra steps. A similar channel for decrease input pulses and the decrease limit switch 350 enters the card at pins 17 and 16 producing negative decrease pulses through gate 352 which may be observed at TP2. These pulses set the state of up-down count logic 344 to the opposite state. Both increase and decrease pulses produce positive pulse outputs through gate 354 which may be observed at TP3. Each of these pulses produces a toggling of the $2^0$ flip-flop 356 on the trailing edge of the pulse. The $2^1$ flip-flop 358 is toggled on every other pulse, as controlled by the up-down count logic 344 so that the two flip-flops function as one up-down counter. The outputs from the $2^1$ flip-flop drive the current amplifying channels to amplifiers 360 and 362 with oppositely phased square wave signals having the frequency of one-quarter the input pulse repitition rate. The outputs of the $2^0$ and $2^1$ flip-flops are decoded by the same-different logic 364 to drive the other two current amplifying channels to amplifiers 366 and 368 with oppositely phased square waves also having the frequency of one-quarter the input pulse repitition rate.

The time-delay power turn-off logic 370 removes power from all four motor windings when no pulses are being received. This circuit senses when the spacing between pulses becomes greater than several seconds and produces an inhibiting input to all four current amplifiers.

Detector Amplifier Circuit Card

Figure 6:
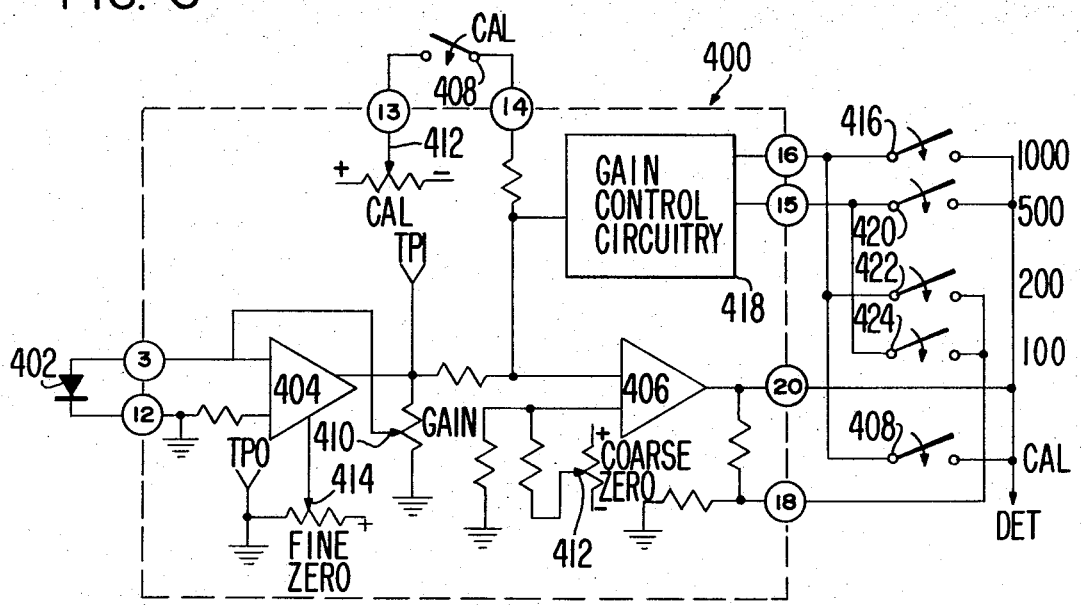
FIG. 6 is a block diagram of the detector amplifier circuit card.

Referring to FIG. 6, the Detector Amplifier Circuit Card 400 takes a current signal from the detector dosimeter diode 402, converts it to a voltage in a first stage amplifier 404 and amplifies this voltage in a second stage amplifier 406 with a gain determined by the front panel DET R/MIN selector shown in FIG. 2 to produce the detector output signal. The card 400 also contains a circuit for producing a full scale detector output signal for calibrating the X-Y Recorder when the CAL switch 408 is depressed.

The current from the detector dosimeter diode 402 enters the card at pin 3 and is fed to the input of the first stage amplifier 404. This amplifier performs the function of converting the current to a voltage with the current-to-voltage conversion factor being determined by the setting of a gain potentiometer 410. This potentiometer determines the calibration of the two stage amplifier in rads/min. The two stage amplifier is coarse zero adjusted by the potentiometer 412 on the second stage and fine zero adjusted by the potentiometer 414 on the first stage.

The output signal from the first stage of amplification is observable at TP1 and would normally be between −0.20 and −2.0 volts for full scale deflection of the meter 134 in FIG. 2 depending on the setting of the DET R/MIN selector in FIG. 2. If the DET R/MIN selector is set to 1000, closing switch 416, the gain control circuitry 418 causes the signal to be amplified by a factor of 5 in the second stage. When set at 500, closing switch 420, the signal is amplified by a factor of 10. The 200 and 100 scales interposed by switches 422 and 424 are identical to the 1000 and 500 scales except that the gain is boosted by an additional factor of 5. When the DET R/MIN selector is in the CAL position closing switch 408, the voltage on the CAL potentiometer 412, which is normally set to approximately −10 volts, is amplified in an inverting manner. This produces a +10 volt output at card pin 20 which gives a full scale meter deflection and allows a dosimeter scale on the X-Y recording unit 104 in FIG. 1 to be calibrated in rads/min.

Reference Amplifier Circuit Card

Figure 7:
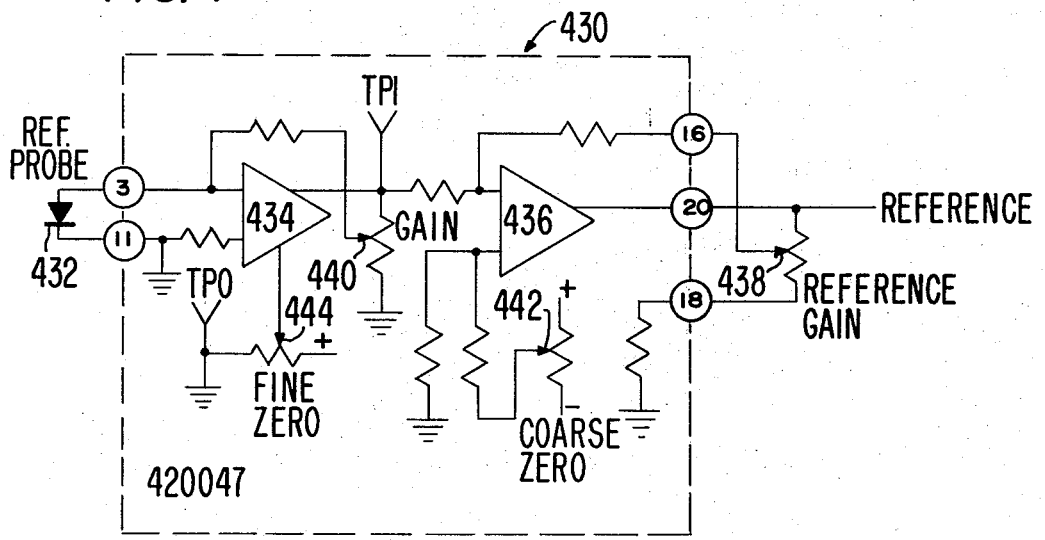
FIG. 7 is a block diagram of the reference amplifier circuit card.

Referring to FIG. 7, the Reference Amplifier Circuit Card 430 takes a current signal from the reference dosimeter diode 432, converts it to a voltage in a first stage amplifier 434, and amplifies this voltage in a second stage amplifier 436 with a gain determined by the front panel GAIN potentiometer 438 to produce the reference output signal. The function of the reference signal is to cancel time variations in the radiation field being measured. It is not concerned with the spatial variations of the radiation field within the water tank 106 in FIG. 1.

The current from the reference dosimeter 432 enters the card at pin 3 and is fed to the input of the first stage amplifier 434. This amplifier performs the function of converting the current to a voltage, with the current-to-voltage conversion factor being determined by the setting of the gain potentiometer 440. This potentiometer determines the gain. The gain is also continuously adjustable by the GAIN potentiometer 438 shown on the front panel in FIG. 2 so that the voltage from the Reference Amplifier Circuit Card 430 can be nulled against the voltage from the Detector Amplifier Circuit Card 400. The two stage amplifier is coarse zero adjusted by the potentiometer 442 on the second stage and fine zero adjusted by the potentiometer 444 on the first stage. The reference signal is attenuated by either the REFERENCE PERCENT potentiometer on the front panel shown in FIG. 2 or by the Percent Switching Logic Circuit Card (described hereafter) before it is fed into the Null Amplifier Circuit Card as follows.

Null Amplifier Circuit Card

Figure 8:
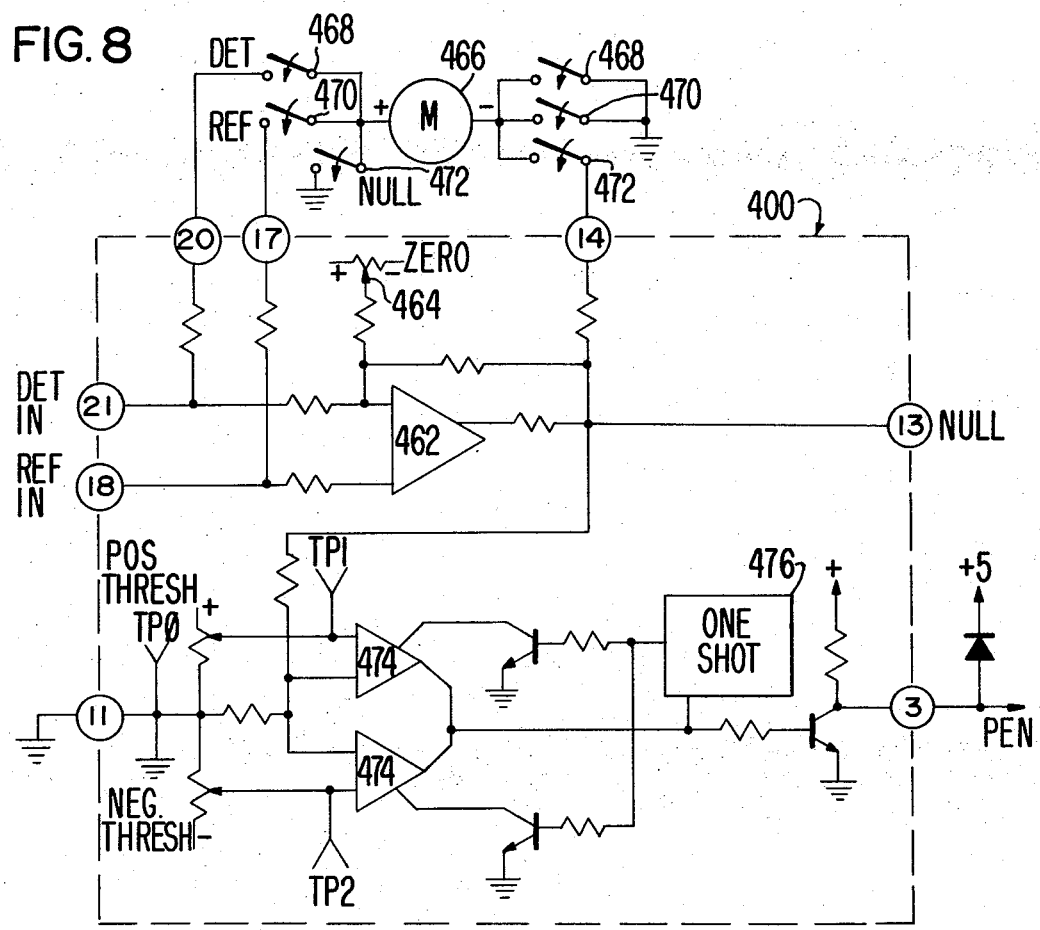
FIG. 8 is a block diagram of the null amplifier circuit card.

Referring to FIG. 8, the Null Amplifier Circuit Card 460 takes the difference between the signal from the Detector Amplifier Card 400 in FIG. 6 and the attenuated signal from the Reference Amplifier Card 430 in FIG. 7 and amplifies this difference by a factor of 100 to create the null signal. The null signal, the detector signal and the attenuated reference signal are displayed on the front panel meter 134 in FIG. 2. The null signal is compared to small positive and negative threshold voltages, and when it lies between these thresholds a signal is generated which causes the pen on the X-Y Recorder to drop as noted in the description in reference to FIG. 3. If the null signal passes through the threshold region rapidly, a one shot circuit generates a pulse which causes the pen to drop for 0.1 seconds, its minimum required down time.

The detector signal enters the Null Amplifier Card 460 at pin 21 and is amplified in an inverted manner with a gain of 100. The attenuated reference signal enters the card at pin 18. The signal is amplified in non-inverting manner in null amplifier 462 with a gain of 100. The signal out of the amplifier 462 at card pin 13 is 100 times the difference between the two input signals. The null amplifie is zero adjusted by potentiometer 464 so that the null signal will be zero when the two input signals are equal.

The signal which is fed to the front panel multiple reference meter 464 through card pin 14 is inverted so that the meter reads negative when the detector signal is too low. The detector signal which is fed to the meter through card pin 20 and the attenuated reference signal which is fed to the meter through card pin 17 are not inverted, so they will always read positive on the meter. Three pairs of switches 468, 470 and 472 correspond to the three similarly labeled METER selectors shown on the front panel in FIG. 2.

The null signal is attenuated by a factor of 4.7 and fed to opposite polarity inputs of the dual comparator. A positive threshold voltage of approximately 5 millivolts, which is observable at TP1, is introduced to one-half of the comparator. The negative threshold voltage of approximately −5 millivolts, which is observable at TP2 is introduced to the other half of the comparator. If the attenuated Null signal lies outside of the ± 5 millivolt threshold region, the pen, controlled through card pin 3, remains up. When the output is in the threshold region or passes through it the pen will drop. The one-shot circuit causes it to drop for 0.10 second, minimum.

Servo Control Circuit Card

Figure 9:
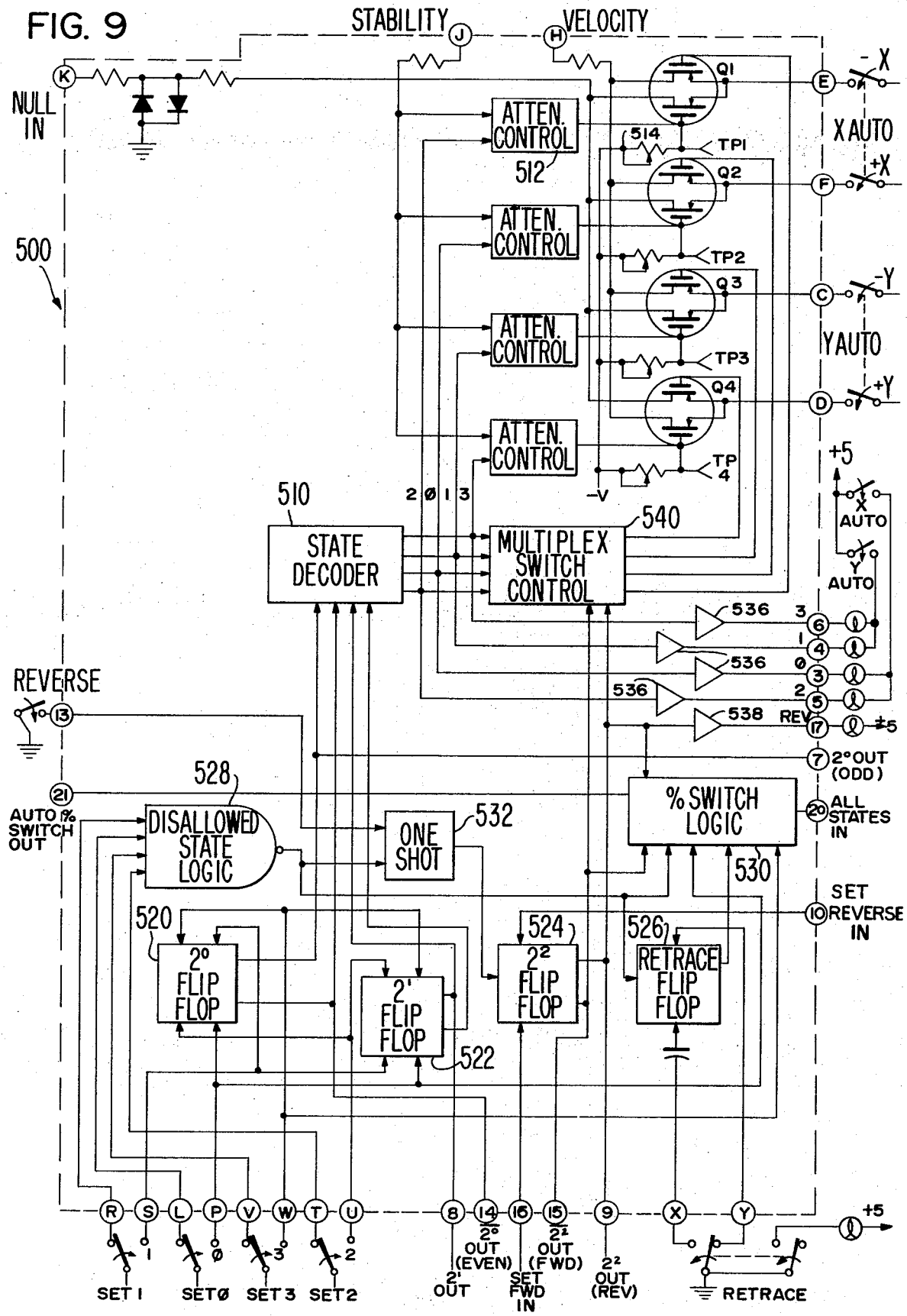
FIG. 9 is a block diagram of the servo control circuit card.

Referring to FIG. 9, the Servo Control Circuit Card 500 functions as an analog multiplexer which transfers the signal from the VELOCITY control potentiometer, located on the front panel shown in FIG. 2, and the signal from the output of the Null Amplifier Circuit Card in FIG. 8 which is controlled by the STABILITY potentiometer also located on the front panel shown in FIG. 2 to an appropriate pair of output signal lines according to which STATE and direction being plotted. There are four analog output lines, two drive the X axis stepping pulse generator and two drive the Y axis stepping pulse generator which have been described in reference to FIG. 4. The card contains the memory circuits for holding STATE and direction information. The card also contains the circuits for manual and automatic direction reversal, control of the RETRACE mode and generation of an automatic percent switch-down signal.

The signal from the VELOCITY potentiometer on the front panel shown in FIG. 2 enters the card at pin H. This signal is fed to the four velocity multiplex transistors (Q1 through Q4) which comprise half of the multiplex switches. The switch which is on and the direction in which the probe is driven at a constant velocity is determined by the STATE and direction being plotted in accordance with the following Table.

TABLE 1

| Drive Direction | Transistor "ON" | STATE and Direction |
|---|---|---|
| −X | Q1 | 3 and forward or 1 and reverse |
| +X | Q2 | 1 and forward or 3 and reverse |
| −Y | Q3 | 2 and forward or 0 and reverse |
| +Y | Q4 | 0 and forward or 2 and reverse |

Figure 10:
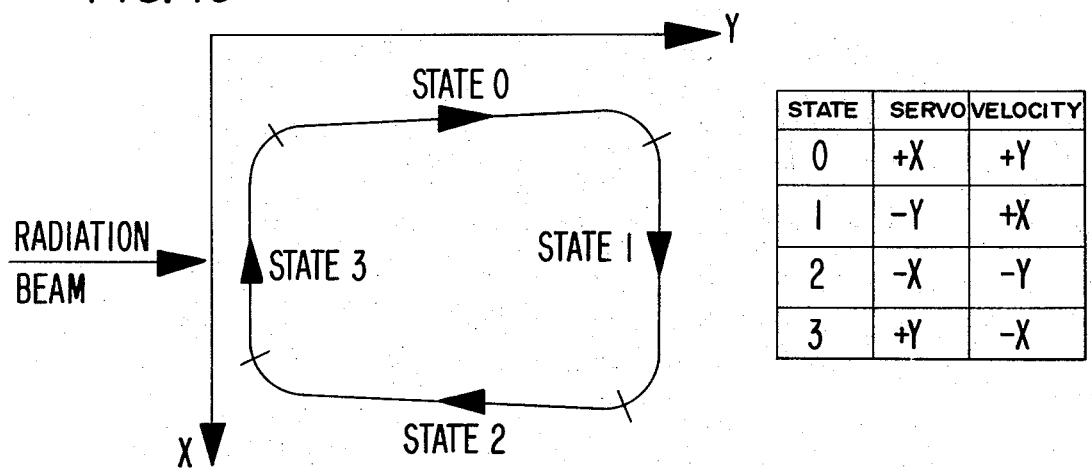
FIG. 10 is a schematic representation of the servo state and velocity direction table.

A schematic representation of the state in the basic forward direction is shown in FIG. 10 with an accompanying chart of state, servo and velocity conditions. These states correspond to the basic STATE selectors as labeled 0, 1, 2 and 3 in FIG. 2. A change in plotting direction is entered by the REVERSE selector in FIG. 2. The schematic representation corresponds to a view of the detector probe tracking from the top of the water phantom tank 106 in FIG. 1.

The signal from the null amplifier output enters the card at pin K. This signal is attenuated and limited to ±0.7 volts. This limited signal is fed to the four signal multiplex transistors which function as variable attenuators as well as switches. The transistor which is on is determined by the STATE being plotted only and not by the direction of plotting in accordance with Table 2.

TABLE 2

| Drive Direction | Transistor "ON" | STATE |
|---|---|---|
| −X | Q1 | 2 |
| +X | Q2 | 0 |
| −Y | Q3 | 1 |
| +Y | Q4 | 3 |

The direction of drive indicated in Table 2 is that which would be obtained for a positive input null signal which occurs when the detector signal is too small. When the detector signal is too large, the null signal reverses polarity and the directions of servo drive are accordingly reversed in an analog fashion without switching to a different multiplex transistor.

The gate circuits for turning on the null signal multiplex transistors are identical for all four channels. The attenuation controls normally pull the gates of these multiplex transistors up to approximately −1 volt. This voltage turns these transistors off, since the maximum signal voltage on the source or drain will not be above +0.5 volts, and the gate must be at least 5 volts below the source to turn the transistor on. When STATE 2 is to be plotted, for example, the STATE 2 output from the state decoder 510 rises to approximately +4 volts, causing the attenuation control 512 to release the −1 volt signal on the gate of Q1. The gate voltage at transistor Q1 would then be pulled down to −15 volts by the trim potentiometer 514 turning the multiplex transistor on fully. However, a signal from the STABILITY potentiometer, which can vary from +15 ¼ volts to −15 ¼ volts for 0 to maximum instability, enters the card at pin J and is fed through the attenuation control 512 to the gate. This signal raises the gate voltage, which is observable at TP1, and causes the field-effect transistor to function as a variable attenuator as well as a multiplex transistor. This variable attenuator controls the amplitude of the 2.5 Hz oscillation in the null signal and determines the amount of scatter obtained in the isodose plot and the speed with which the servo can return to the isodose plot when it is off the null. The four trim potentiometers in the gate circuits of the multiplex transistors are used to balance the gains of these variable attenuators for the four STATES so that the stability is not changed when switching between STATES. The corresponding transistor gate voltages are observable at test points TP1 through TP4.

A 3 bit binary register on the card stores STATE and direction information for control and logic purposes. The lowest order bit is stored by the $2^0$ flip-flop 520. The two outputs of this bit are brought out on card pins 7 and 14 as odd and even STATE logic signals, respectively, for use by the State Switching Logic Card described in reference to FIG. 11, following. The second bit is stored in the $2^1$ flip-flop 522. A logical one output at card pin 8 indicates that either STATE 2 or STATE 3 is stored in the register. The third bit, the forward-REVERSE information, is stored in the $2^2$ flip-flop 524. The REVERSE and forward logic signals are fed out through card pins 9 and 15 to the State Switching Logic Card, FIG. 11. A fourth flip-flop 526 which is used only for control of Automatic Percent Switching stores the information as to whether the plotter is in the first or second half of a RETRACE cycle, initiated by entry from the RETRACE selector on the front panel in FIG. 2.

Figure 11:
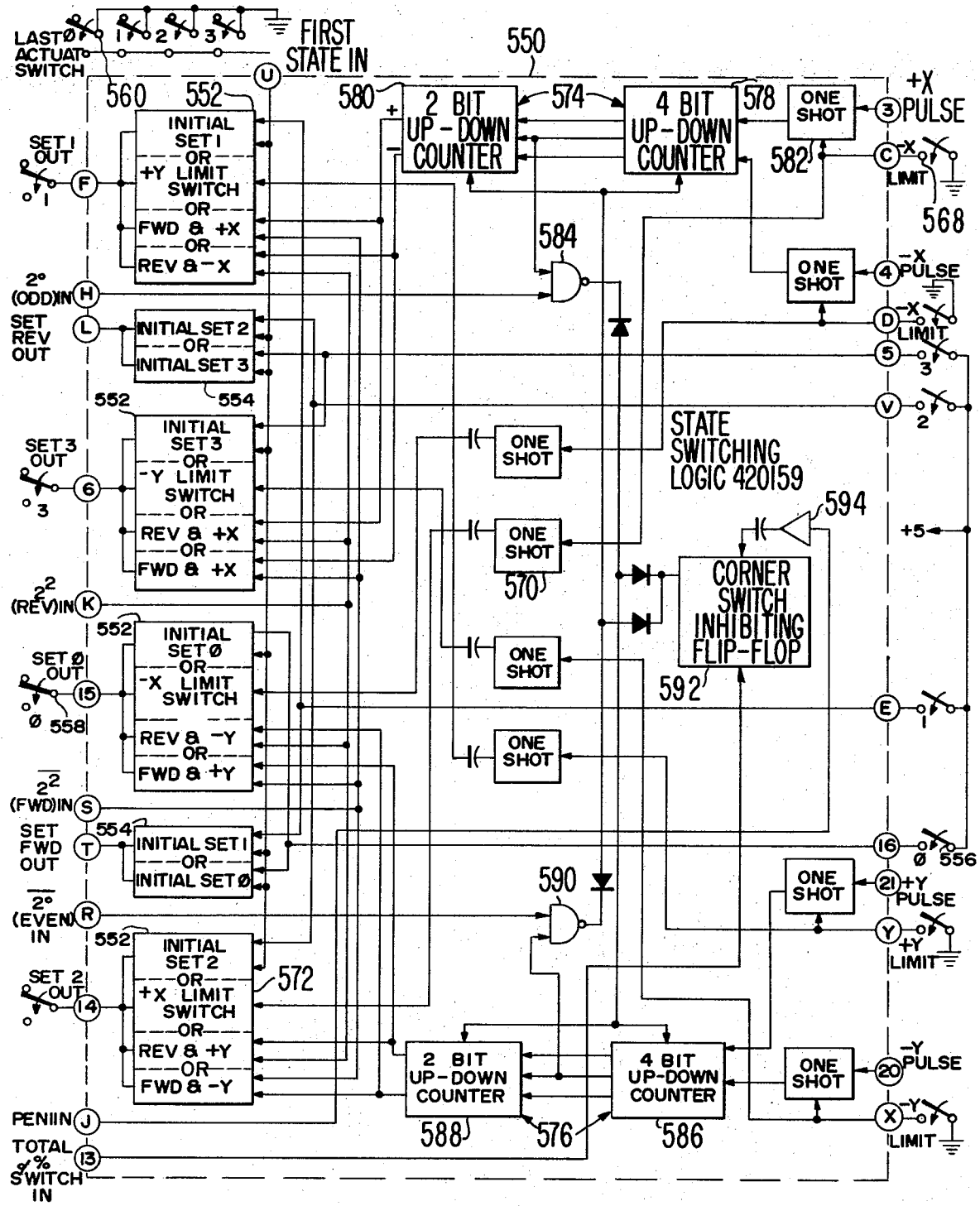
FIG. 11 is a block diagram of the state switching logic circuit card.

The first two binary bits are set to STATE 0 through 3 by signals which enter at card pins P, S, U and W from the State Switching Logic Card in FIG. 11. These lines are ordinarily maintained at +3.3 volts. Negative pulses to ground on the set input lines which occur either when the first STATE switch is depressed or during the plotting sequence, set a pair of gate outputs to the high logic state. For example, a Set 1 pulse entering at card pin S sets the $2^0$ flip-flop 520 to the high state and the $2^1$ flip-flop 522 to the low state. However, if a Set 1 pulse is produced by the State Switching Logic Card, FIG. 11, when STATE 1 has not been selected as an allowable STATE by the front panel STATE selector, this Set 1 pulse is steered into card pin R. An attempt such as this to switch to a disallowed state occurs only at the end of the desired contour, and one of the four inputs to the Disallowed State Logic 528 which are normally maintained at +3.3 volts will receive a negative going pulse, causing a positive pulse at the output. This pulse causes a RETRACE toggle in the retrace flip-flop 526 if this is a contour to be retraced, an automatic percent switch down pulse at the percent switch logic 530 if the logic was already in the second half of a RETRACE cycle, and after inversion by a one-shot multivibrator 532 causes a forward-REVERSE toggle in the $2^2$ flip-flop 522. The retrace flip-flop 526 will be permanently held in the second half of a RETRACE cycle by the input at card pin Y if the front panel switch is not set for RETRACE. However, if the front panel switch is set for RETRACE, the signal entering the card at pin X is pulsed coupled to the retrace flip-flop 526 to set this flip-flop to the first half of a RETRACE cycle. In this condition, the retrace flip-flop is free to be toggled. It should be noted that selection of the RETRACE function must be carried out after the initial STATE selection so that the retrace flip-flop will begin in the proper half of the RETRACE cycle and not be subsequently set to the second half by any initial STATE selection toggle pulses.

The $2^2$ flip-flop is set to either forward or REVERSE by signals entering at card pins 16 and 10 respectively, which come from the State Switching Logic Card. The $2^2$ flip-flop is also toggled between forward and REVERSE by a one shot multivibrator which is triggered either by an attempted set to a disallowed state as previously described, or by a manual REVERSE input from the front panel switch entering at card pin 13.

An automatic percent switch down signal from the percent switch logic 530 is produced as a negative going pulse out on card pin 21 in either of two possible ways. The first method is when an attempted set to a disallowed state occurs while in the second half of a RETRACE cycle. The second method is when circular isodose plots are being made and a transfer from STATE 3 to STATE 0 occurs in the forward plotting direction or a transfer from STATE 0 to STATE 3 in the REVERSE direction. For circular isodose plotting, all four states are allowed, and card pin 20 is open. During circular isodose plotting there is no retracing unless manually initiated, and the percentage switch down always occurs at the boundary between the 0 and 3 STATES whether plotting in the forward or REVERSE direction.

The state decoder 510 decodes the outputs from the storage of the first two STATE bits to produce a high logic signal on one of the four output lines to signify 0, 1, 2 or 3 respectively. These STATE signals turn on the appropriate null signal multiplex transistors and also turn on the lamp drivers 536. The lamps are only lit however when the axis control signals are in the AUTO position. STATES 0 and 2 are lit when the X switch is in the AUTO position indicating X axis null servoing, and STATES 1 and 3 are lit when the Y axis switch is in the AUTO position indicating Y axis servoing. The fifth lamp driver 538 takes a REVERSE signal and turns on the REVERSE lamp through the driver when the retrace flip-flop 526 is in the REVERSE state and either or both of the X and Y axis control switches are in AUTO. This REVERSE signal, the forward signal and the four signals from the state decoder 510 enter the multiplex switch control 540 which determines which of the four velocity multiplex transistors are to be turned on by dropping its gate voltage to −15 volts.

State Switching Logic Circuit Card

Referring to FIG. 11 the function of the State Switching Logic Card 550 is to generate negative going pulses which set the STATE and direction to one of the four operating STATES and one of the two operating directions. These setting signals are produced in one of three possible ways:

1. When a STATE selector on the front panel is the first of four to be depressed or the last of the four to be released,
2. When the detector probe is driven into one of the four limit switches on the X-Y Drive, or
3. When an output signal is received from a pair of cross-coupled, up-down, position-counting registers on the card which determines when the corner of a plotted contour has been reached.

A corner of a contour is determined by sensing that approximately eight millimeters of travel occur in the servoed axis before a four millimeter displacement is obtained in the constant velocity driven axis. This corner switching is inhibited by clearing a flip-flop at the start of the transfer between percentage contours and is not released until a pen drop signal is obtained to set the flip-flop indicating that nulling has occurred on the new contour.

The four quadruple logic gates 552 produce negative going pulses to ground from normal +5 volt output levels on card pins F, 6, 15 and 14 to set to STATES 1, 3, 0 and 2 respectively. The two dual logic gates 554 produce similar pulses out on card pins L and T to set to the REVERSE and forward directions respectively. Output pulses from these pins enter directly, in the case of the dual logic gates, or through contacts, in the case of the quadruple logic states, the state and direction input sets of the Servo Control Circuit Card in FIG. 9. All inputs to all of the gates have at least one of the two inputs normally in the low logic state so that the output voltages are all normally high.

The four STATE switches each consist of three switch contacts on each station, two of which close before the third actuates. The last actuating switch contacts on the four STATE switches are all connected to card pin U. The first actuating switch contacts consist of the initial STATE setting switches connected to card pins 16, E, V and 5 and the pulse steering switches between the STATE setting outputs of this card and the setting inputs to the Servo Control Circuit Card.

Initial STATE setting will be illustrated by assuming that the STATE 0 switch 556 is the first switch closed by depressing STATE 0 selector on the front panel in FIG. 2. The voltage at card pin 16 is normally in the low logic state. When the STATE 0 switch is closed, card pin 16 is connected to +5 volts giving high logic state inputs to Initial Set 0 points. The other inputs to these two gates are also in the high logic state. The gate outputs go to the logic state producing Set 0 and Set forward signals out on card pins 15 and T. Card pin T is connected directly to the Servo Control Circuit Card to set to the forward direction, and card pin 15 is connected through a contact 558 on the STATE 0 switch which actuates at the same time to steer this logic level to the Servo Control Circuit Card to set to the 0 STATE. The STATE set contacts are shown in both FIG. 9 and FIG. 11 for clarity. These low logic levels last until the last actuating STATE 0 switch contact 560 closes; connecting card pin U to ground. When this happens, the gate inputs at Initial Set 0 go to the low logic state, causing the two gate outputs to rise. Thus, negative pulses are produced on these two output lines having a duration lasting between the actuation of the first and last closing contacts 558 and 560, respectively, on the STATE 0 switch 556. The input at card pin U not only inhibits the Set 0 and Set forward gates, but also inhibits the other STATE setting and direction setting gates from producing setting pulses due to STATE switch closures as long as one of the four STATE switches is depressed, connecting card pin U to ground.

Similarly the other three STATE setting switches, if first depressed, will produce setting pulses on other combinations of STATE and direction output lines. The logic is designed so that initial setting to STATES 0 or 1 will produce the forward direction set, whereas initial setting to STATE 2 or 3 will produce a REVERSE direction set. The last STATE switch to be released will produce the same setting pulses as would be produced if it were the first actuated due to the fact that the switch contact connected to card pin U is released first, eliminating the set inhibit signal to all gates. After initial STATE switching, the Set Rev and Set Fwd outputs at card pins L and T are both inhibited by the signal entering at card pin U and have no further function in setting direction while any of the STATE switches are depressed.

The second method of producing STATE setting pulses is by limit switch actuation on the X-Y Drive. For example, if the probe is driven into the +X limit switch 568, a condition which is likely to happen if plotting in the forward direction while in STATE 1 or plotting in the REVERSE direction while in STATE 3, a switch to STATE 2 is desired without changing direction. The limit switch actuation will ground card pin C, a line which is normally held up to +5 volts. This negative going transition causes a one-shot multivibrator 570 to fire, the output of which is capacitively coupled to the +X limit switch input 572 on the Set 2 logic gate. This signal produces a negative Set 2 output pulse at card pin 14, which is fed to the Servo Control Card. The +X limit switch could also be actuated while plotting in STATE 2, however, in this case the Set 2 output pulse produced would make no change in the STATE being plotted. In a similar fashion the limit switch input signals on card pins D, Y and X produce setting to STATES 0, 1 and 3.

The third method of producing STATE setting pulses is by detecting that a corner of the contour being plotted has been reached. This is accomplished by two cross-coupled, up-down, position-counting registers on the card, one of which 574 continuously counts the X axis stepping pulse and the other 576 counting the Y axis pulses. The two registers are cross-coupled in that the register for the axis which is being driven at constant velocity produces a pulse at the end of every 16 steps (4 millimeters) which resets the counting register for the servoed axis to zero. At this reset time a race between the two counters begins, and if the counter for the servoed axis accumulates 32 counts in the positive direction or 33 counts in the negative direction (approximately 8 millimeters of travel) before it is again reset by the 16 count pulse from the velocity axis, it will produce a pulse out on one of two output lines. This pulse will set to the appropriate new STATE, and in doing so will convert from an odd STATE number to an even STATE number or vice-versa. The odd-even state information signals entering at card pins H and R from the $2^0$ flip-flop 520 in FIG. 9 then go to the opposite logic levels and this interchanges the cross coupling between counting registers, reversing the velocity and servoed axis roles. The 2:1 ratio of servoed to velocity axis displacement required for corner switching means that the probe must be moving at an angle of greater than 63° with respect to the velocity axis, and this creates little likelihood that a premature switch to the new STATE will be attempted or that a switch back to the old STATE will occur.

The X axis up-down counting register 574 is a 6 bit binary counter having a maximum count capacity of 64 consisting of a 4 bit counter 578 followed by a 2 bit counter 580. Positive going +X pulses enter the card at pin 3 from the X axis stepping pulse generator in FIG. 4. These positive pulses trigger a one-shot multivibrator 582 which drives the up-counter. The +X driving pulse at card pin 3 also causes the stepping motor on the X-Y drive to step at the time of its trailing edge. If any given step drives the detector probe into the +X limit switch 568, the switch closure grounds card pin C. This falling transition will immediately terminate the one-shot pulse if it is not already completed, and the continuation of the ground potential will cause the one-shot multivibrator 582 not to respond to additional +X pulses, so that no further X axis up counting occurs until the +X limit switch 568 is released. An identical −X pulse circuit takes −X pulse and limit switch signals in at card pins 4 and D respectively and will produce X axis down counting pulses.

When the 4 bit counter 578 has counted a net of 16 pulses in either the + or −X directions, it will produce a positive pulse out. If the STATE being plotted is an odd number, the input at card pin H will be high, and the pulse is inverted by a logic gate 584 to reset the Y axis counting register to zero. When a count of 32 in the +X direction has been accumulated, a positive pulse will be produced out of the 6 bit counting register. If plotting in the forward direction, card pin S will be high as registered from one state of the $2^2$ flip-flop 524 in FIG. 9 and a set 1 pulse will be produced out at card pin F. This condition will occur if plotting in STATE 0 and the corner is turned into STATE 1. If plotting in the reverse direction, card pin K will be high instead and a Set 3 pulse will be produced out at card pin 6. This condition will occur when plotting in STATE 0 and the corner is turned into STATE 3. If the X axis up-down counter instead counts in the negative direction by 33 counts, a positive pulse will be produced out of the register which is fed to the Set 1 and Set 3 gates. This pulse also produces Set 1 or Set 3 pulses but with the forward-reverse criteria reversed. These pulses occur normally when plotting in STATE 2 and the corner is turned into STATE 3 in the forward plotting direction, or the corner is turned into STATE 1 in the reverse plotting direction.

There is an identical 6 bit up-down position counter 576 consisting of a 4 bit counter 586 followed by a 2 bit counter 588 for the Y axis. The pulses out of this register produce Set 0 and Set 2 pulses out on card pins 15 and 14 which are also controlled by the forward-reverse input signals. For illustration let us assume that we are plotting in STATE 0 forward so that the detector probe is being driven at constant velocity in the +Y direction. The Y register counts continuously in the positive direction, producing pulses out to the Set 0 and Set 2 logic gates. Since plotting is in the forward direction, card pin S is high as registered from the $2^2$ flip-flop in FIG. 9 and the output Set 0 pulses produced at card pin 15 accomplish nothing since the logic is already in the 0 STATE. An even numbered STATE is being plotted so the input at card pin R is high as registered from the $2^0$ flip-flop in FIG. 9. Each time 16 +Y pulses have been counted, a positive pulse is produced out of the 4 bit counter 586 through logic gate 590 causing the X axis counting register 574 to be reset to zero. As the corner is turned between STATES 0 and 1, the X register starts to count in the positive direction at a faster rate than the Y register. When 32 counts are accumulated in the X register before 16 are accumulated in the Y register, a pulse occurs which produces a Set 1 pulse out at card pin F. The odd-even input signals at card pins H and R are then reversed and the coupling of every 16th X axis pulse, which was previously inhibited by the low logic state at card pin H is now made possible since this level is now high. Positive pulses then occuring will reset the Y register to zero. The Y register is inhibited from resetting the X register in odd numbered states by the low logic input at card pin R.

When the corner is turned into STATE 2 the Y register will start to count fast in the −Y direction producing a pulse out, which causes a Set 2 pulse to be generated out on card pin 14.

If STATE 3 is disallowed and no retracing is being done, a percent switch down signal will be produced at the end of the STATE 2 plot. During the transfer between percentage contours, the X and Y position counters must be inhibited from generating erroneous STATE setting signals, since it is the servoed axis that moves at a rapid rate to the new contour. A percent switch down signal, whether automatically or manually produced, enters the card at pin 13. This signal is a negative going pulse which sets the output of the corner switch inhibiting flip-flop 592 to the low logic state, clamping both X and Y register reset lines to the low state. As long as the flip-flop is in this condition neither register can count, and the count in both registers is zero. When the detector probe reaches the new contour, a pen drop signal is generated which produces a pulse in at card pin J. This pulse through driver 594 sets the corner switch inhibiting flip-flop 592 to the opposite state. In normal operation these pen drop pulses are being continuously received and the inhibiting flip-flop 592 is being continuously set to the non-inhibiting state.

Percent Switching Logic Circuit Card

Figure 12:
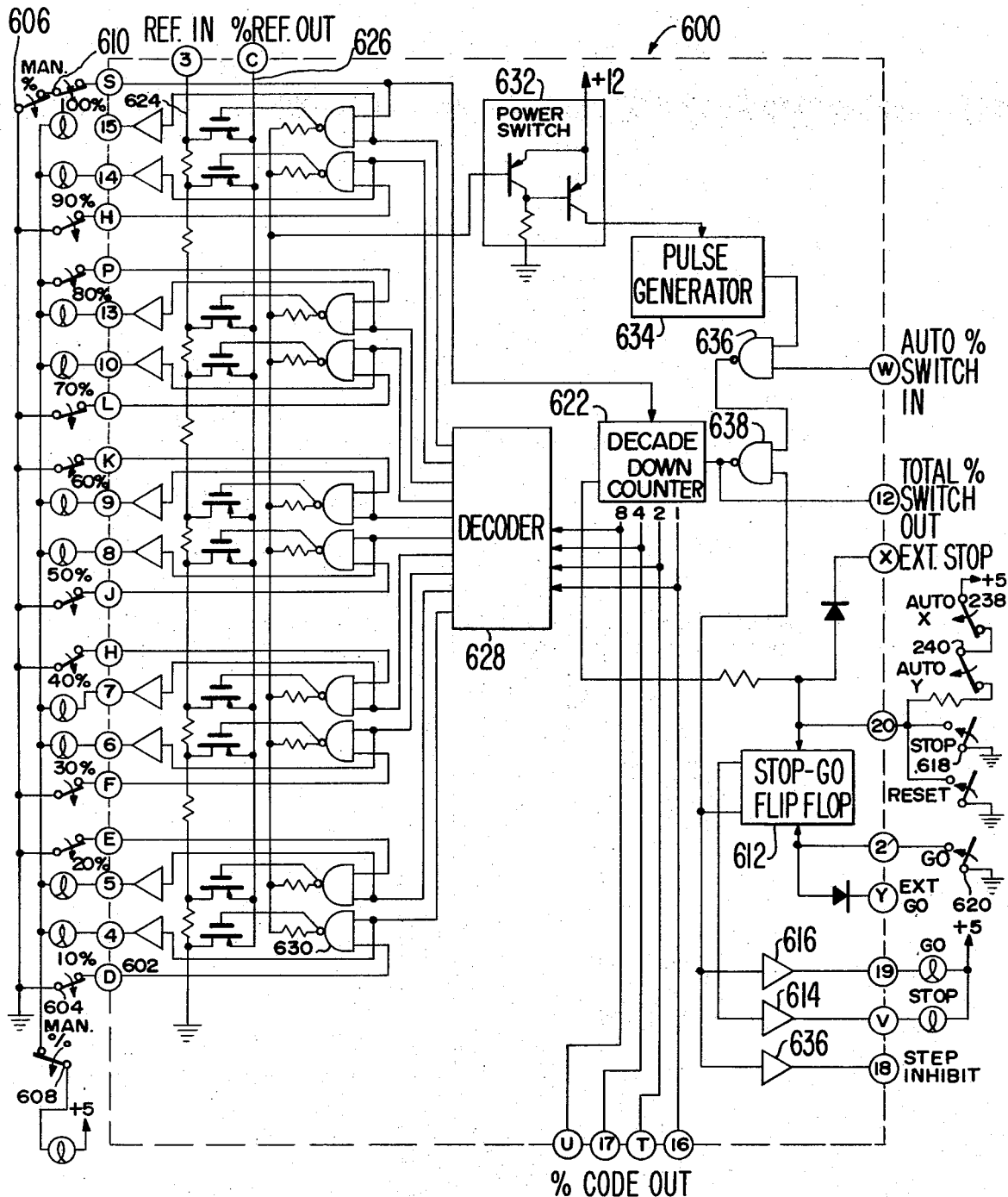
FIG. 12 is a block diagram of the percent switching logic card.

Referring to FIG. 12, the function of the Percent Switching Logic Card 600 is to take the signal from the Reference Amplifier Circuit Card in FIG. 7, divide it into ten percentage increments in a precision resistor divider network, and switch one of the ten percentage signals onto an output line to the Null Amplifier Circuit Card 460 in FIG. 8. The percent selected is controlled by the front panel REFERENCE PERCENT selectors, shown in FIG. 2 and by automatic percent switching pulses received from the Servo Control Circuit Card 500 in FIG. 9. The lamp drivers 602 on the card illuminate the switch corresponding to the percent selected, for example, driver 602 for the 10 percent switch 604 in FIG. 12. The REFERENCE percent switches have three levels of priority. Top priority is held by the MANual percent switch 606 and 608, jointly. When the MAN selector on the front panel in FIG. 2 is depressed, the manual REFERENCE PERCENT potentiometer is connected into the circuit, and this card and the remaining REFERENCE percent switches have no influence on the REFERENCE percent signal fed to the null amplifier in FIG. 8. When the MAN percent selector is retracted, the next priority is held by the 100 percent switch 610. When REFERENCE 100 selector on the front panel in FIG. 2 is depressed, the card selects 100 percent of the reference signal, and the remaining nine percentage switches have no influence. When both the MAN and 100 percent switches are retracted, the remaining nine percentage switches have equal priority. Those percentage selectors which are depressed will be selected in sequence, beginning with the highest, each time an automatic percent switch down pulse is received from the Servo Control Card in FIG. 9. The card also contains the stop-go flip-flop 612 and lamp drivers 614 and 616 which are controlled by the front panel STOP and GO selectors in FIG. 2 which operate STOP GO switches 618 and 620 respectively in FIG. 12. When in the STOP state, the flip-flop 612 inhibits both the automatic percent switch down at the decade down counter 622 and the generation of X and Y axis stepping pulses for the X-Y drive through card pin 18.

When the MAN percent selector is not depressed, the signal from the reference amplifier enters at card pin 3. This analog signal is divided into 10 equal parts by a precision resistor divider chain 624. One of the 10 analog multiplexing switch transistors is turned on to switch a certain percentage of the reference signal onto the output line 626 at card pin C.

The percent selected is determined by the state of the decade down counter 622 and the percentage selectors which are depressed on the front panel in FIG. 2. The output from the down counter 622 is an 8421 binary coded decimal (BCD) signal. This code, in positive logic, is fed out through card pins U, 17, T and 16 to the position counters option referred to in the description of FIG. 3. The four line BCD code is fed to a decoder 628 which produces a high logic level signal on one of its ten output lines corresponding to the state of the four input lines.

The switch driving circuits are level-translating and inverting AND gates, for example gate 630 for the 10 percent switch 604, which provide −10 volts to turn on one of the ten multiplex switches and +12 volts on the other nine outputs. If the switch corresponding to a lamp which is illuminated is not depressed, then none of the ten multiplex switches is turned on and the ten outputs are all at +12 volts. The power switch 632 is then turned on to supply 12 volt power to the pulse generator 634. The negative pulse produced by the pulse generator 634 is combined in a NAND gate 636 with automatic percent switching pulses from the Servo Control Card in FIG. 9 entering on card pin W. These percent switch-down pulses can be inhibited before entering the down counter 622 by a second NAND gate 638 if the STOP-GO flip-flop 612 is in the STOP state. When in the GO state, a uni-junction oscillator in the pulse generator 634 will continue to produce down counting pulses until a percent corresponding to a depressed selector is found, at which point one of the ten outputs will go to −10 volts, turning off the power switch circuit 632 and removing power from the uni-junction oscillator in the pulse generator. When the down counter overflows from 0 to 9, i.e., from 100 percent to 90 percent, a negative pulse is produced out of the decade down counter 622. This pulse will set the stop-go flip-flop 612 to the STOP state. Thus down counting is inhibited, but the uni-junction oscillator will not be turned off unless the 90 percent selector is depressed.

The stop-go flip-flop 612 is also controlled by the momentary STOP and GO selectors on the front panel in FIG. 2 and the state of the flip-flop is indicated by the lamp drivers 614 and 616 respectively connected to card pins V and 19 which illuminate these selectors. A set to the STOP state is also produced by depressing the percent RESET selector on the front panel in FIG. 2 which operates RESET switch 634 in FIG. 12, both STOP and GO states can be produced by external negative going pulses entered at card pins X and Y through lines in the optional POSITION COUNTERS connector. When in the STOP state, an amplifier 636 will switch card pin 18 to −15 ¼ volts and inhibit the generation of X and Y axis stepping pulses in the Stepping Pulse Generator Circuit Cards referred to with reference to FIG. 4. Since it is undesirable to have the X and Y axis motion stopped by overflow from the down counter 622 at times when the down counter is not being used, such as when making depth dose or flatness plots or when using MAN PERCENT selection, the setting to the STOP state by the overflow pulse from down counter is inhibited by the connection from card pin 20 through contacts 238 and 240 on the AUTO X and AUTO Y selectors, respectively to +5 volts. If neither of these selectors is depressed, then the STOP pulse into the stop-go flip-flop 612 is inhibited, but if either AUTO X or AUTO Y is depressed, thus opening the series connected contacts, the pulse will set the flip-flop to the STOP state.

In the GO state, the down counter 622 steps down one count in response to a negative going automatic percent switch down pulse received at card pin W from the Servo Control Circuit card 500 in FIG. 9. If this pulse switches to a disallowed percentage, the uni-junction oscillator in the pulse generator 634 will be turned on until an allowed percentage is found. Down counting pulses from either source are fed through card pin 12 to the State Switching Logic Circuit Card 550 in FIG. 11 to set a flip-flop 592 on that card which inhibits corner STATE switching during the transfer between percentage contours.

When the MAN percent selector is depressed, power is removed from the ten percentage lamps by contact switch 608. Depressing either the MANual or 100 percent selector eliminates the ground connection at card pin S by contact switches 606 and 610 respectively and causes the clear input of the down counter 622 to be pulled up to +5 volts, thus setting the counter to zero.

I claim:

1. Isodose plotting apparatus for plotting penetration type radiation measurements comprising:
   phantom means at which a radiation source is directed and in which radiation measurements are taken,
   detection means for taking radiation intensity measurements in said phantom means, said detection means having a moveable detector means which generates signals for measuring direct radiation intensity,
   drive means having a plurality of drive axes for moving said detector means in said phantom means,
   control means having a velocity control and a servo control responsive to signals from said detector means for moving said detector means under velocity control on a first drive axis and under servo control on a second drive axis along a path representative of a predetermined dosage within said phantom means, sensing means for sensing that a predetermined distance of movement of said detector on an axis under servo control has occurred relative to a predetermined distance of movement of an axis under velocity control, and
   switching means responsive to said sensing means for automatically interchanging the drive axes under said velocity control and said servo control when a predetermined distance of movement of said detector means on said axis under servo control has occurred relative to a predetermined distance of movement on said axis under velocity control.

2. The isodose plotting apparatus of claim 1 wherein said predetermined distance of movement of said detector means on said axis under servo control relative to said predetermined distance of movement on said axis under velocity control is in a relationship of not less than 1 to 1.

3. The apparatus of claim 2 wherein said control means moves said detector means in steps and said relationship of movement in steps for interchanging the drive axes is approximately 32 steps to 16 steps.

4. The apparatus of claim 2 wherein said relationship is a distance of approximately 8 millimeters to 4 millimeters.

5. The isodose plotting apparatus of claim 1 comprising further recording means for recording the movement of the detector means.

6. The isodose plotting apparatus of claim 1 wherein said moveable detector means comprises a moveable detector probe which measures radiation at its present position in the phantom means and generates a detector signal.

7. The apparatus of claim 6 wherein said detection means comprises further a reference probe which measures radiation at a select position in the phantom means and generates a reference signal.

8. The apparatus of claim 7 wherein said control means has electrical circuit means which receives said detector signal and reference signal, calibrates the reference signal to a select value of the detector signal, adjusts the reference signal to a select percent of the select value of the detector signal and compares the adjusted reference signal to the detector signal to obtain a null signal.

9. The apparatus of claim 8 wherein said servo control of said control means utilizes said null signal for moving said detector means under servo control.

10. In an isodose plotting apparatus for plotting and recording isodose contours for penetration type radiation measurements, the plotting apparatus having a drive unit, a control unit and a recording unit wherein a detector probe, which generates signals for radiation measurement, is moveable in the drive unit and is servoed responsive to signals from said probe on a first axis and velocity driven on a second axis under control of the control unit wherein the isodose contours are tracked by the drive unit and are recorded by the recording unit, an improvement comprising means for sensing movement of the probe assuming an angle not less than 45° relative to the axis on which the probe is velocity driven, and means responsive to said sensing means for automatically switching the axis on which the detector probe is velocity driven when the direction of detector probe movement assumes an angle not less than 45° relative to the axis on which the probe is velocity driven.

11. The apparatus of claim 10 wherein the angle is greater than 60°.

12. In an isodose plotting apparatus for tracking isodose contours for penetration type radiation measurements, an improvement comprising:
means for measuring relative radiation intensity including a detector probe, which generates signals for measuring radiation intensity, having a plurality of defined states of movement each state comprising a defined axis and direction of velocity drive and a defined axis and direction of servo control for tracking along a path representative of a predetermined dosage, said servo control being responsive to detector probe signals,
sensing means for sensing a displacement on the axis of servo control which is not less than a predetermined displacement on the axis of velocity drive, and
automatic switching means for selectively switching from one state to a subsequent state when a displacement on the axis of servo control is not less than the predetermined displacement on the axis of velocity drive.

13. The improvement of claim 12 comprising further:

means to displace said probe on a first axis by electrical stepping pulses, and
means to dislace said probe on a second axis by electrical stepping pulses.

14. The improvement of claim 13 comprising further:

a storage register for storing information as to the state of detector probe movement and for controlling the displacement of the detector probe on said first axis and on said second axis.

15. The improvement of claim 14 wherein said switching means has:

a pair of cross-coupled, up-down position counting registers, in which,
the first register of said pair counts electrical stepping pulses on said first axis, and,
the second register of said pair counts electrical stepping pulses on said second axis.

16. The improvement of claim 15 comprising further:

electrical logic means connecting said storage register and said pair of cross-coupled, up-down position counting registers for determining the axis of servo control and the axis of velocity drive.

17. The improvement of claim 16 wherein said position counting register counting electrical pulses on the axis of velocity drive is set to count from a preset number to a predetermined number of pulses, and the position counting register counting electrical pulses on the axis of servo control is set to concurrently count from a preset number to a second predetermined number of pulses.

18. The improvement of claim 17 having means to reset the position counting registers to the said preset numbers when said position counting register counting electrical pulses on the axis of velocity drive reaches its predetermined number before said position counting register counting electrical pulses on the axis of servo control reaches its predetermined number and means to switch the axis of velocity drive and the axis of servo control on said registers when said register counting electrical pulses on the axis of servo control reaches its predetermined number before said register counting electrical pulses on the axis of velocity drive reaches its predetermined number.

19. The improvement of claim 18 wherein said electrical logic means connecting said storage register and said cross-coupled up-down position counting registers changes the state of detector probe movement in the storage register when the axis of velocity drive and the axis of servo control on said registers are switched.

20. Isodose plotting apparatus for plotting penetration type radiation comprising:
phantom means at which a radiation source is directed and in which radiation measurements are taken,
detection means for taking radiation intensity measurements in said phantom means, said detection means having a moveable detector means which generates signals measuring direct radiation intensity,
drive means having a plurality of drive axes for moving said detector means in said phantom means,
control means having a velocity control and a servo control for moving said detector means under velocity control on a first drive axis and under servo control responsive to signals from said detector means on a second drive axis along a path representative of a predetermined dosage within said phantom means,
sensing means for sensing a predetermined displacement of said detector means on the second drive axis under servo control relative to a predetermined displacement on the first axis under velocity control,
oscillation means for oscillating said detector means across a plotted isodose contour within controlled limits, and switching means responsive to said sensing means for automatically and reversibly interchanging the servo control with velocity control on said second axis and the velocity control with the servo control on said first axis when a predetermined displacement of said detector means on said second axis under servo control has occurred relative to a predetermined displacement on said first axis under velocity control.

21. The isodose plotting apparatus of claim 20 wherein said moveable detector means comprises a moveable detector probe which measures radiation at its present position in the phantom means and generates a detector signal.

22. The apparatus of claim 21 wherein said detection means comprises further a reference probe which measures radiation at a select position in the phantom means and generates a reference signal.

23. The apparatus of claim 22 wherein said control means has electrical circuit means which receives said detector signal and reference signal, calibrates the reference signal to a select value of the detector signal, adjusts the reference signal to a select percent of the select value of the detector signal and compares the adjusted reference signal to the detector signal to obtain a null signal.

24. The apparatus of claim 23 wherein said null signal is variably attenuated to generate an oscillating servo control signal.

25. The apparatus of claim 24 wherein said servo control of said control means utilizes said oscillating servo control signal for moving said detector means under servo control.

26. The apparatus of claim 24 wherein said control means has further a dual comparator wherein said null signal is compared to a small positive and a small negative threshold voltage, and when said null signal lies between said threshold voltages a recording control signal is generated.

27. The isodose plotting apparatus of claim 26 comprising further recording means for recording movement of the detector means, said recording means having a marking device, a recording medium and a recording control for marking said marking device on said recording medium when a plotted isodose contour is crossed by said detector means.

28. The apparatus of claim 27 having further circuit means wherein said recording control signal causes said recording control to mark said marking device on said recording medium.

29. The apparatus of claim 28 wherein said circuit means comprises a one shot circuit whih generates a pulse causing said marking device to mark for a minimum required down time.

30. The apparatus of claim 20 in combination with computer control means for positioning the detector means on said plurality of drive axes and utilizing radiation measurements.

31. The combination of:
isodose plotting apparatus for plotting penetration type radiation measurements comprising:
phantom means at which a radiation source is directed and in which radiation measurements are taken,
detection means for measuring radiation intensity in said phantom means, said detection means having a moveable detector means for measuring direct radiation intensity and circuit means for generating radiation intensity signals,
drive means having a plurality of drive axes for moving said detector means in said phantom means under servo control on a first axis responsive to signals from said circuit means and under velocity control on a second axis along a path representative of a predetermined dosage within said phantom means, and
computer control means for positioning said detector means on said plurality of drive axes and utilizing said radiation intensity signals from said detection means for tracking isodose contours of penetration type radiation measurement, said computer control means including means for sensing that a predetermined distance of movement of said detector means on an axis under servo control has occurred relative to a predetermined distance of movement on an axis under velocity control, and means responsive to said sensing means for automatically and reversibly switching servo control with velocity control on said first axis and velocity control with servo control on said second axis when a predetermined distance of movement of said detector means on the axis under servo control has occurred relative to a predetermined distance of movement on the axis under velocity control.

32. The combination of claim 31 wherein said isodose plotting apparatus comprises further component control means for positioning said detector means on said plurality of drive axes and selector means for selecting one of said computer control means and component control means.

* * * * *